United States Patent [19]

Nelson

[11] Patent Number: 4,528,176
[45] Date of Patent: Jul. 9, 1985

[54] SODIUM ALUMINUM HYDRIDE PRODUCTION

[75] Inventor: Gunner E. Nelson, Baton Rouge, La.

[73] Assignee: Ethyl Corporation, Richmond, Va.

[21] Appl. No.: 450,032

[22] Filed: Dec. 15, 1982

[51] Int. Cl.$^3$ ............................................. C01B 6/24
[52] U.S. Cl. .................................................. 423/644
[58] Field of Search ....................................... 423/644

[56] References Cited

U.S. PATENT DOCUMENTS

| | | | |
|---|---|---|---|
| 3,104,252 | 7/1963 | Rodd et al. | 260/448 |
| 3,138,433 | 6/1964 | Gruilice | 423/644 |
| 3,210,150 | 10/1965 | Powers | 423/644 |
| 3,387,933 | 6/1968 | Snyder | 423/644 |
| 3,387,949 | 6/1968 | Snyder | 423/644 |
| 3,505,036 | 4/1970 | Lindsay | 423/644 |
| 3,556,740 | 10/1971 | Murib | 23/365 |
| 4,045,545 | 5/1977 | Ashby | 423/644 |
| 4,081,524 | 9/1978 | Ashby | 423/644 |

FOREIGN PATENT DOCUMENTS

| | | | |
|---|---|---|---|
| 1084700 | 7/1960 | Fed. Rep. of Germany | 423/644 |
| 1105167 | 3/1968 | United Kingdom | 423/644 |
| 1185707 | 3/1970 | United Kingdom | 423/644 |
| 186983 | 10/1966 | U.S.S.R. | 423/644 |

OTHER PUBLICATIONS

Ashby, E. D., et al., *Inorganic Chemistry*, 2, 499, (1963), pp. 499-504.
Socha, A. J., et al., Analysis of Aluminum Powder, 1964, pp. 1-5, and i-vi.
Alcoa Atomized Powders, 1968, 1969.
Zakharkin et al., "Acad. of Sciences, USSR, Proceedings", vol. 145, Aug. 1962, pp. 656-658.

*Primary Examiner*—H. T. Carter
*Attorney, Agent, or Firm*—Donald L. Johnson; John F. Sieberth; John F. Hunt

[57] ABSTRACT

A process for the production of alkali metal aluminum tetrahydrides from its elements by pressure hydrogenation, particularly characterized by production from an aluminum containing a reaction-promoting quantity of titanium, zirconium, hafnium, vanadium, niobium, or uranium. Titanium is preferred in a quantity of at least about 250 parts per part by weight aluminum. The process is preferably carried out on a semi-continuous basis in the presence of an alkali metal aluminate which is carried through to successive batches as an active heel.

A novel composition of alkali metal aluminum tetrahydride in liquid reaction medium also containing alkali metal aluminate activator/catalyst. The alkali metal aluminate is preferably retained in a reaction heel for catalysis of subsequent reaction cycles.

28 Claims, No Drawings

SODIUM ALUMINUM HYDRIDE PRODUCTION

BACKGROUND OF THE INVENTION

I. Field of the Invention

This invention relates in general to complex metal hydrides and their synthesis and, in particular, to an economical and highly advantageous process for production of alkali metal aluminum tetrahydrides.

II. Description of the Prior Art

The alkali metal aluminum hydrides have been made in the past by various techniques which have not proven to be economical for one reason or another. Various processes have been proposed for making alkali metal aluminum hydrides in both hydrocarbon and other solvents from alkali metal hydrides and from the elements. Such processes required extremely long reaction times (10–20 hours). Thus, there exists a need for a process to efficiently produce alkali metal aluminum hydrides, especially the tetrahydrides.

The tetrahydrides find use in reaction with various silicon-containing compounds to produce high purity silicon as a product of commerce primarily for semiconductor use. Of course, the alkali metal tetrahydrides have been used for other purposes as well. The worldwide production of sodium aluminum tetrahydride is quite low and I know of only one major producer.

Various metal catalysts have been used in the past for reaction promotion. These metals include titanium, scandium, and others. However, their use was suggested only for promotion of reactions to prepare organoaluminums. Many commercially available aluminums contain a trace amount of titanium, usually about 10 to 100 ppm on a weight basis. Other aluminums with high titanium (or similar metal) content are available but are not usually considered for chemical synthesis because of contamination.

CROSS REFERENCE

Reference is made to related co-pending U.S. patent application Ser. No. 457,897, filed Jan. 14, 1983 in my name, and co-pending U.S. patent application Ser. No. 496,474, filed May 20, 1983 in the name of M. F. Gautreaux. Those two applications and this application are commonly assigned.

SUMMARY OF THE INVENTION

The present invention is directed to an advantageous process for the provision of alkali metal aluminum tetrahydrides. The reaction is particularly characterized by the use of an aluminum containing a reaction-promoting quantity of certain metals. The invention provides the advantage of very good per batch yields at reaction rates not previously achieved. Thus, a cyclic or semi-continuous process offers particular advantages and is a preferred delineation of the invention.

The inventive process is initially catalyzed by an alkali metal aluminate. Advantageously, an aluminate species is carried forward in a reaction heel of liquid reaction medium for catalysis of subsequent cyclic production of alkali metal aluminum tetrahydrides. A stoichiometric excess of aluminum on sodium is normally preferred to assure an adequate supply of aluminum not only for reaction but, also, for the preferred in situ formation of alkali metal aluminate.

Advantageously, a ball mill reactor or similar high shear apparatus is not required to carry out the inventive process, as is the case with certain prior art processes.

The present invention is broadly a process for the production of an alkali metal aluminum tetrahydride comprising pressure hydrogenating an alkali metal reactant and aluminum containing a reaction-promoting quantity of a member selected from the group consisting of titanium, zirconium, hafnium, vanadium, niobium, and uranium.

The present invention is also a semi-continuous process for the production of alkali metal aluminum tetrahydride, said process comprising the steps of:

(a) pressure hydrogenating an alkali metal reactant with about a stoichiometric excess of aluminum, said aluminum containing a reaction-promoting quantity of a member selected from the group consisting of titanium, zirconium, hafnium, vanadium, niobium, and uranium;

(b) withdrawing alkali metal aluminum tetrahydride product so as to leave an activated aluminum heel for recycle in a subsequent hydrogenating step;

(c) adding alkali metal reactant and any additional aluminum containing a reaction-promoting quantity of said member required to make a reaction mixture containing a stoichiometric excess of said aluminum; and (d) pressure hydrogenating said reaction mixture and recovering product alkali metal aluminum tetrahydride.

Since the alkali metal aluminum tetrahydride product solution may be readily recovered by decanting it from the powdery aluminum-containing heel, the heel is readily available for reuse as catalyst in subsequent cycles. Thus, the present invention is also a composition of matter comprising an alkali metal aluminum tetrahydride in an innocuous reaction medium also containing an alkali metal aluminate.

DESCRIPTION OF THE PREFERRED EMBODIMENT

A preferred embodiment of the invention is the production of alkali metal aluminum tetrahydrides from alkali metal, aluminum, and hydrogen under pressure at elevated temperature, wherein the aluminum contains a reaction-promoting amount of titanium, zirconium, hafnium, vanadium, niobium, or uranium.

The aluminum for the invention may be in any of several forms, preferably some comminuted form, more preferably a fine powder.

The use of titanium, zirconium, hafnium, vanadium, niobium, or uranium for a synthesis such as this invention has not been recognized heretofore.

A suitable range for the reaction-promoting quantity of metal is about 300–2500 parts by weight per million parts aluminum. A preferred range is 450–2000 ppm. A more preferred range is about 1000–2000 ppm. The reaction of the invention generally proceeds at a faster rate with increased weights of metal. The upper point of diminishing return has not been determined. A valuable and useful aluminum powder is sold under the trade designation I-783 by Reynolds.

The titanium or other listed metal is preferably present in the aluminum as an alloy. Notably, addition of titanate esters are not very effective for the invention. Other forms may well be advantageous.

Titanium and zirconium are preferred because of their availability but uranium may be preferred where a waste source or other supply is readily available. Other similar metals may prove to be equivalent for the invention.

The alkali metals useable with the invention include sodium, lithium, and potassium. Sodium is preferred for its availability and cost.

The process is best carried out in an innocuous liquid reaction medium. By innocuous, I mean one which does not interfere with the inventive process. The reaction medium may be selected from a broad range of materials. The reaction mediums may be hydrocarbons, ether-type solvents including polyethers and cyclic ethers.

More preferred are the diloweralkyl ethers of alkylene glycols such as the dimethyl ether of ethylene glycol (monoglyme), the dimethyl ether of propylene glycol, the dimethyl ether of diethylene glycol (diglyme), the dimethyl ether of triethylene glycol (triglyme), the diethyl ether of ethylene glycol, and the like. Most preferred are diglyme and monoglyme, especially diglyme.

The reaction is a pressure hydrogenation at least about 100 psig up to about 5000 psig. A preferred range is about 750-2000 psig. More preferred is 1000-2000 psig. The most preferred pressure range depends upon materials of construction and reactants/products.

The reaction will proceed at relatively low temperature but an elevated temperature is preferred. A suitable range is about 65°-300° C. depending upon reactants and reaction medium. A preferred range is 100°-200° C. and a more preferred range is 120°-170° C. The most preferred temperature range depends upon choice of reactants and medium as well as materials of construction for the reactor. About 140°-160° C. is usually most preferred.

The reaction is carried out so that product alkali metal aluminum tetrahydride is readily recovered. A suitable range of weight percent product tetrahydride in reaction medium is about 5-20 percent. A preferred range is 10-15 weight percent.

A catalyst is preferably used in the inventive process. The catalysts may be added or formed in situ, normally in a first reactive period or induction period. The catalysts found most suitable for this invention are alkali metal aluminate compounds. These catalysts include those formed from sodium aluminum tetrahydride, sodium aluminum tetrachloride, sodium aluminum tetrafluoride, lithium aluminum tetrahydride, lithium aluminum tetrachloride, lithium aluminum tetrafluoride, potassium aluminum tetrafluoride, and aluminate compounds formed from lower alcohols and organoaluminums especially aluminum alkyls. These include alkali metal aluminates of structure I:

$$MAl[O(R_1-O)_mR_2]_mH_{4-n} \qquad (I)$$

wherein M is an alkali metal, $R_2$ is alkyl, $R_1$ is alkylene, m is zero or greater, and n is one to four. The aluminates of structure I include $NaAl(OCH_2CH_2OCH_3)_2H_2$ (vitride) and $NaAl[OCH(CH_3)]_2H_2$. Examples of those formed from aluminum alkyls are $NaAl(Ch_2CH_3)_2H_2$.

The alkali metal aluminates of structure I, and those formed from the alkali metal aluminum tetrahalides, and the alkali metal aluminum tetrahydrides are preferred. A preferred aluminum alkyl is triisobutyl aluminum.

The catalysts are present in about 3-15 mole percent on sodium. The reaction is preferably run with sodium as the limiting reactant.

The reaction is preferably run on a semi-continuous or cyclic basis with a reactive aluminum-containing heel or solid residue being carried through for successive cycles. All indications are that the cycles may be continued indefinitely without depletion of activating aluminum-containing material in the heel.

The invention is also a composition of matter formed from the reaction and from which valuable, useful product mixture/solutions may be decanted. The sodium aluminum tetrahydride solutions are preferred compositions.

According to the invention, the first cycle in the semi-continuous process for preparation of an alkali metal aluminum tetrahydride solution includes activation by catalytic species of the aluminum powder.

The aluminum is preferably present in a stoichiometric excess of, e.g., sodium present. The excess is preferably such that the gram-atom ratio of aluminum to sodium is at least about 2:1, more preferably about 3:1 or more. My experiments have shown that when a 1:1 ratio is used, even when a catalytic species is added (rather than formed in situ), the reaction rate is generally only about 40 to 60% of the reaction rate, depending on catalyst concentration, of a 2:1 ratio of aluminum to sodium.

Of course, where a catalytic species of alkali metal aluminate is formed in situ, one must provide enough reactants for both catalyst formation and reaction. In subsequent steps of the cyclic process, as where aluminum and sodium or other alkali metal are depleted and then replenished, I have found it suitable to add about 1.1 gram-atom parts aluminum per gram-atom part sodium. Some aluminum is lost as fines in the decanted product, especially where good settling time is not permitted.

The in situ catalyst activation (formation of alkali metal aluminate) is accomplished by adding a catalyst source such as triisobutyl aluminum to the liquid reaction medium, preferably after addition of the sodium or other alkali metal to the medium, preferably diglyme. The reaction mixture is then pressure hydrogenated, preferably at at least about 750 psig and elevated temperature, preferably about 120°-160° C.

When the hydrogen take-up is complete or significantly slow, the product solution is cooled. The product alkali metal aluminum tetrahydride in liquid reaction medium is carefully decanted leaving an active aluminum-containing heel for subsequent cyclic steps.

With proper decantation techniques, the active heel should last indefinitely. This heel has been recovered after five cycles in a process making sodium aluminum tetrahydride. Settling test have indicated nearly complete settling of residual aluminum after 5-10 minutes at 85° C.

According to a preferred embodiment of the invention, after activation, the reaction of sodium, aluminum containing 1900 ppm titanium, and hydrogen at 1000 psi and 140° C. results in 75 percent conversion after only fifty minutes.

The following Examples serve to further illustrate the invention.

EXAMPLE 1

The reaction vessel used was a 300 mL stainless steel autoclave with a single, magnetically driven stirrer (used at 600 RPM's). The reactor was equipped with an external heater, an internal thermocouple, and an internal cooling coil to maintain a narrow range for the reaction temperature of the exothermic reaction. To the autoclave was charged 8.0 grams sodium (0.321 moles after correction for catalyst formation), 9.6 grams (0.356 moles) aluminum powder containing 1900 parts by weight titanium per million parts aluminum, 5 mL triethyl aluminum (10.5 mole percent based on Na), and 110 mL toluene. The reactor was purged with hydrogen, pressure tested, heated to 140° C., and pressurized with hydrogen to 2000 psig. After an induction period of about thirty minutes, the reaction was essentially complete after 2.5 hours. The vessel was cooled and vented and the solid product was collected by filtration. The product was washed with toluene and pentane, then dried in vacuum. The yield was 20.2 grams of grey solids. For analysis, a 7.2 gram portion of product was extracted with diglyme until a total of 100 mL extract was obtained. Analysis disclosed 1.13 millimoles aluminum per mL, 4.05 millimoles gas per mL. This is a yield of about 101.2% based on aluminum analysis and about 90.7% by gas analysis.

EXAMPLE 2

The general procedure of Example 1 was followed except that the reaction mixture was heated at 160° C. for four hours and then 140° C. for about four and one-half hours. The yield was 94.3 percent on aluminum analysis.

By comparison, the procedure of this example at 160° C. entirely with aluminum containing 180 ppm titanium provided a yield of only 67.2 percent on aluminum after eight hours. Similar runs using aluminum with 1900 ppm titanium but using preformed sodium aluminum diethyl dihydride catalyst at only 4 mole percent on sodium at 160° C. gave only 17 percent yield after six and one-quarter hours. A like run at 200° C. for three hours and 160° C. for two hours provided only a 20.9% yield.

EXAMPLE 3

The same general procedure was followed as in Example 1 except that a polyether solvent reaction medium was used. To the reactor was charged 8.0 grams (0.348 moles) sodium, 35 grams (1.296 moles) aluminum powder containing 1900 ppm titanium, 110 mL diglyme and enough triisobutyl aluminum to make up 6.5 mole percent on sodium. The vessel was purged, pressure tested, heated to 140° C. and pressurized to 1000 psig with hydrogen. After a 50 minute induction period, the reaction was allowed to proceed until no further hydrogen uptake was observed (about 70 additional minutes). The product solution was recovered as usual.

EXAMPLE 4

An active aluminum containing heel from an earlier run using triethyl aluminum in diglyme was in the reaction vessel described in Example 1. To the heel was added 7.2 grams (0.313 mole) sodium, 9.3 grams (0.344 mole) aluminum containing 1900 ppm titanium and 110 mL solvent diglyme. The mixture was pressure reacted with hydrogen at 1000 psig and 140° C. until hydrogen uptake ceased in about three and one-half hours. The vessel was cooled, vented, and the heel recovered as a decant. A diglyme wash of the product was added to the decant. The decant was filtered through a medium porosity frit backed by three-eighths inch Celite. A total of 197.5 grams solution was obtained. Analysis of sample of the solution indicated 4.00% aluminum and 6.40 millimoles per gram gas. The yield was calculated at 97.5 percent. The heel was successfully used in four successive runs with yields at about 100 percent.

EXAMPLE 5

An active heel from an earlier run using aluminum with 500 ppm titanium and triisobutyl aluminum catalysis was in the reactor. To this heel was added 0.313 moles sodium, 0.344 moles aluminum powder containing 450 ppm titanium and 100 mL diglyme. The mixture was pressure hydrogenated at 1000 psig and 140° C. until the hydrogen consumption was calculated to be about 65% conversion on sodium. The vessel was quickly cooled and vented and the product solution decanted. Subsequent charges to the active heel are shown in the table below. In each case, except the last, the reaction was permitted to proceed to about 65% conversion. The last run was carried to completion (about three and one-half hours).

TABLE

| | Short Cycle Series | | |
|---|---|---|---|
| Run | Moles Na | Moles Al | Time (min.) |
| 1 | .313 | .344 | 118 |
| 2 | .187 | .205 | 146 |
| 3 | .226 | .248 | 156 |
| 4 | .226 | .248 | 210 |
| TOTAL | .952 | 1.005 | |

The product solutions were combined and analyzed for an overall yield of about 100%.

Several other reactions were carried out to confirm that higher reaction rates were achieved with higher content of titanium in the aluminum.

The sodium aluminum tetrahydride served as a very good source of catalytic aluminate while conventional organoaluminums such as triethyl aluminum were not as effective as the sodium aluminum tetrahalides or the sodium aluminum dialkoxy dihydrides. Isopropyl alcohol and triisobutyl aluminum proved to be sources of good catalytic species. Also, the dimethyl ether of diethylene glycol and the dimethyl ether of ethylene glycol proved to be highly preferred as compared to the dimethyl ether of triethylene glycol.

The reaction did not proceed with an alkaline earth metal hydride (magnesium hydride) rather than an alkali metal.

Notably, the alkylated catalysts may be disfavored where production of silicon (silane) is envisioned for the tetrahydride.

EXAMPLE 6

This example demonstrates operation of the invention on a larger scale. A five gallon autoclave was purged and pressure tested with nitrogen. The autoclave was equipped with heater and mechanical stirrer. A dipleg extended into the autoclave to a point just three inches above the bottom of the autoclave (where the heel settles). To the vessel was charged 21.9 pounds (9930 grams, about 2.9 gallons) diglyme, 3.86 pounds (1752 grams) sodium aluminum hydride catalyst, 1.64 pounds (746 grams) sodium, and 4.82 pounds (2187 grams) aluminum powder containing 1900 ppm titanium. The vessel was sealed and pressurized to 1000 psig hydrogen at 140° C. with agitation. The reaction was allowed to proceed until hydrogen consumption ceased, about three and one-half hours. The vessel and ingredients were cooled to ambient without agitation in about one hour. About 22.5 pounds of the product was discharged to a nitrogen-purged storage vessel.

Two subsequent runs were produced using the active heel from above and the product was deposited in the storage vessel. In these two runs, 14.0 pounds (6360 grams) diglyme, 1.64 pounds (746 grams) sodium, and 2.12 pounds (963 grams) aluminum with 1900 ppm titanium were charged. The subsequent runs discharged 17.5 pounds and 18.5 pounds product, respectively.

I claim:

1. A process for the production of an alkali metal aluminum tetrahydride comprising pressure hydrogenating at about 750–2000 psig and about 120°–160° C. an alkali metal reactant and aluminum containing at least about 1000 parts by weight per million parts aluminum of an element selected from the group consisting of titanium, zirconium, hafnium, vanadium, niobium, and uranium; in an innocuous reaction medium and in the presence of an alkali metal aluminate catalyst formed by heating an alkali metal aluminum tetrahalide or a lower alcohol under hydrogen pressure in the presence of an alkali metal and aluminum; and forming product alkali metal aluminum tetrahydride.

2. The process of claim 1 wherein said element is titanium.

3. The process of claim 1 wherein said alkali metal is sodium or lithium.

4. The process of claim 3 wherein said alkali metal is sodium.

5. The process of claim 1 wherein said reaction medium is an ether.

6. The process of claim 5 wherein said ether is a polyether.

7. The process of claim 6 wherein said polyether is a diloweralkyl ether of an alkylene glycol.

8. The process of claim 7 wherein said diloweralkyl ether of an alkylene glycol is a diloweralkyl ether of an ethylene glycol.

9. The process of claim 8 wherein said diloweralkyl ether of an ethylene glycol is the dimethyl ether of diethylene glycol.

10. The process of claim 1 wherein said reaction medium is a hydrocarbon.

11. The process of claim 10 wherein said hydrocarbon is toluene.

12. The process of claim 1 wherein said pressure hydrogenating is at about 900–1100 psi.

13. The process of claim 4 wherein said pressure hydrogenating is at about 1000 psi carried out at about 140° C.

14. The process of claim 1 wherein said catalyst is formed in situ by heating an alkali metal aluminum tetrahalide or lower alcohol under hydrogen pressure in the presence of alkali metal and aluminum.

15. The process of claim 14 wherein said catalyst is formed from a lower alcohol.

16. The process of claim 15 wherein said catalyst is formed from isopropanol.

17. The process of claim 1 wherein said catalyst is a compound of the formula I:

$$MAl[O(R_1-O)_m R_2]_n H_{4-m} \quad (I)$$

wherein M is an alkali metal, $R_2$ is alkyl, $R_1$ is alkylene, n is zero or greater, and n is 1 to 4.

18. The process of claim 17 wherein said catalyst of formula I is vitride:

$$NaAl(OCH_2CH_2OCH_3)_2H_2.$$

19. The process of claim 17 wherein M is sodium, m is zero, $R_2$ is isopropyl and n is 2 to 4.

20. The process of claim 1 wherein said catalyst is present in the amount of about 6 to 10 mole parts per 100 gram-atom parts alkali metal reactant.

21. The process of claim 20 wherein said alkali metal reactant is sodium.

22. A semi-continuous process for the production of alkali metal aluminum tetrahydride, said process comprising the steps of:

(a) pressure hydrogenating at about 750–2000 psig and about 120–160° C. an alkali metal reactant with about a stoichiometric excess of aluminum, said aluminum containing at least about 1,000 parts by weight per million parts aluminum of a member selected from the group consisting of titanium, zirconium, hafnium, vanadium, niobium, and uranium; in an innocuous reaction medium and in the presence of an alkali metal aluminate catalyst formed by heating an alkali metal aluminum tetrahalide or a lower alcohol under hydrogen pressure in the presence of an alkali metal and aluminum;

(b) withdrawing alkali metal aluminum tetrahydride product so as to leave an activated aluminum heel for recycle in a subsequent hydrogenating step;

(c) adding alkali metal reactant and any additional aluminum containing a reaction-promoting quantity of said member required to make a reaction mixture containing a stoichiometric excess of said aluminum; and (d) pressure hydrogenating said reaction mixture and recovering product alkali metal aluminum tetrahydride.

23. The process of claim 22 wherein said stoichiometric excess is at least about 2 gram-atom parts aluminum per gram-atom part alkali metal reactant.

24. The process of claim 22 wherein said catalyst is formed in situ.

25. The process of claim 22 wherein said catalyst is a compound of the formula I:

$$MAl[O(R_1-O)_m R_2]_n H_{4-n} \quad (I)$$

where M is an alkali metal, $R_2$ is alkyl, $R_1$ is alkylene, m is zero or greater, and n is 1 to 4.

26. The process of claim 25 wherein said catalyst is $NaAl(OCH_2CH_2OCH_3)_2H_2$ or $NaAl[OCH(CH_3)_2]_2H_2$.

27. The process of claim 22 wherein said innocuous reaction medium is a diloweralkyl ether of an alkylene glycol.

28. The process of claim 27 wherein said diloweralkyl ether of an alkylene glycol is the dimethyl ether of ethylene glycol or the dimethyl ether of diethylene glycol.

* * * * *